Figure 11:
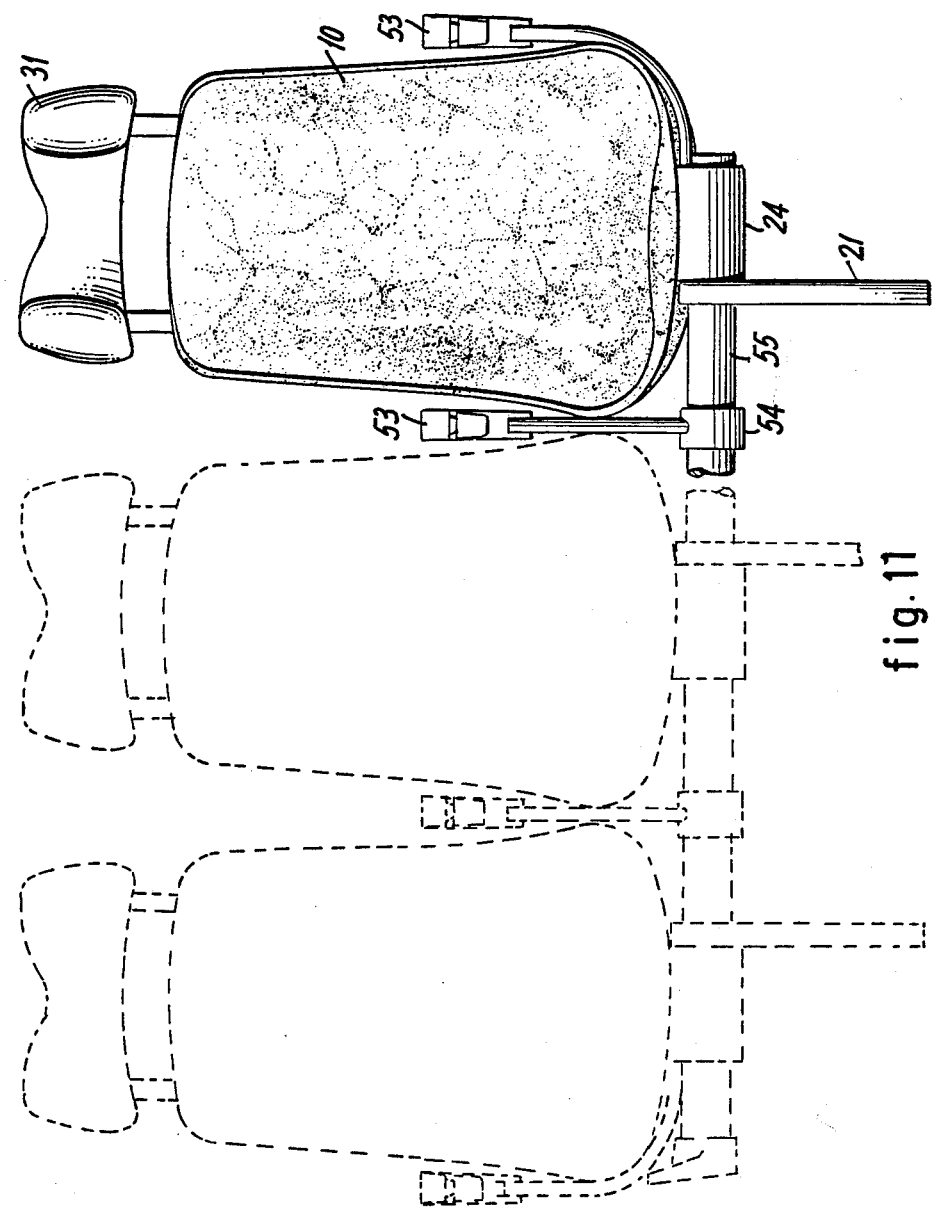

May 26, 1964  E. G. MASON  3,134,627
SEAT FOR PUBLIC USE
Filed March 19, 1962  6 Sheets-Sheet 1
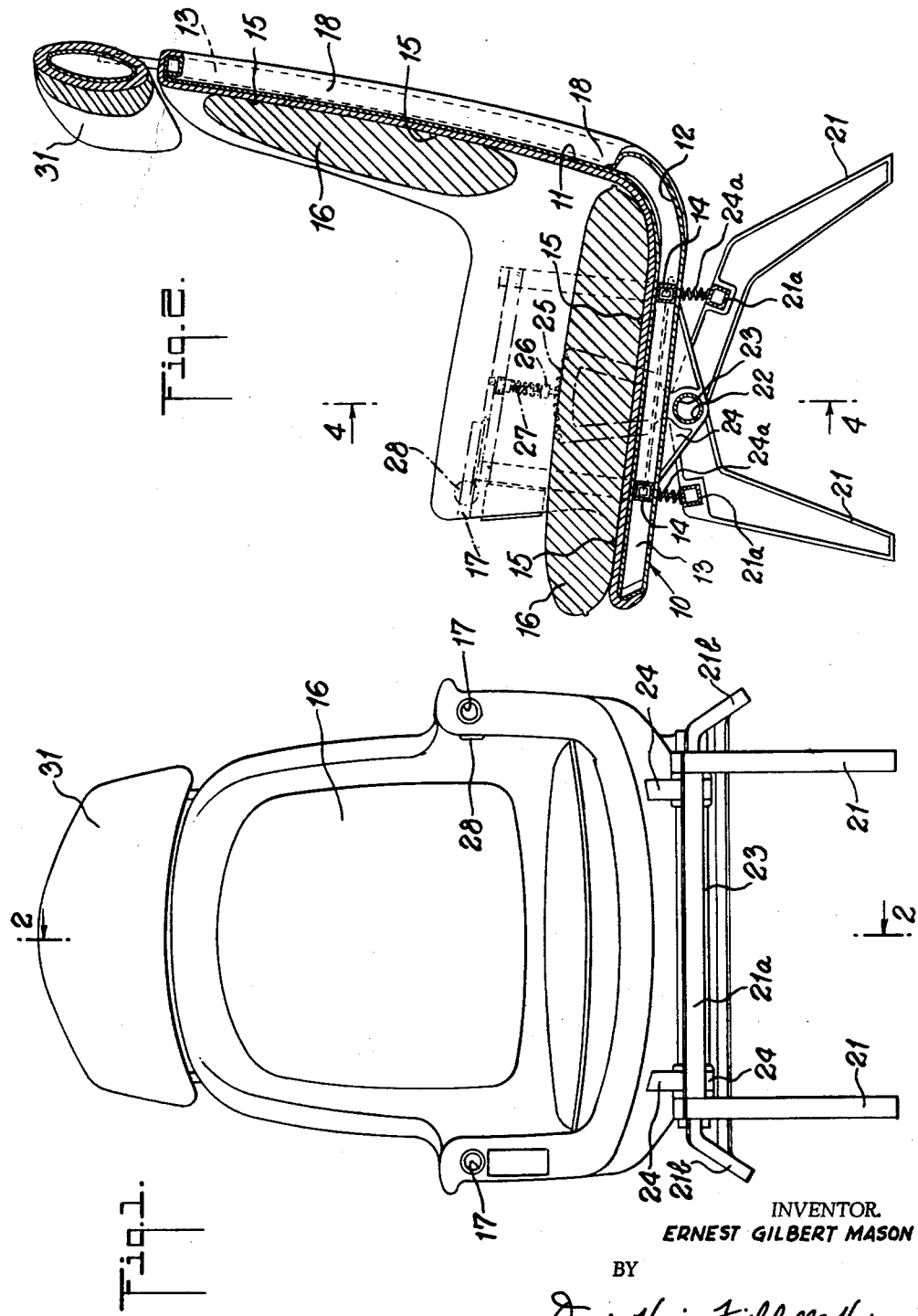
INVENTOR.
ERNEST GILBERT MASON
BY
Davis, Hoxie, Faithfull & Hapgood
ATTORNEYS.

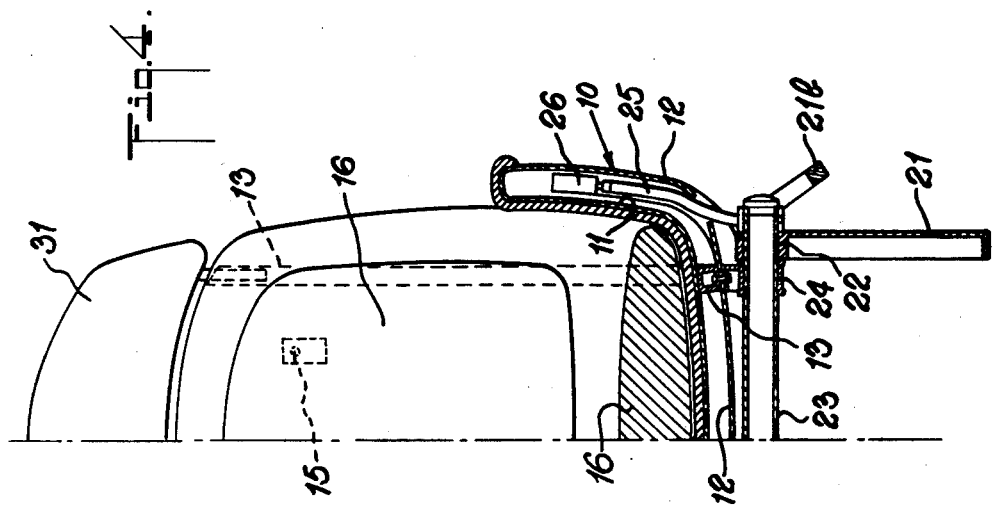
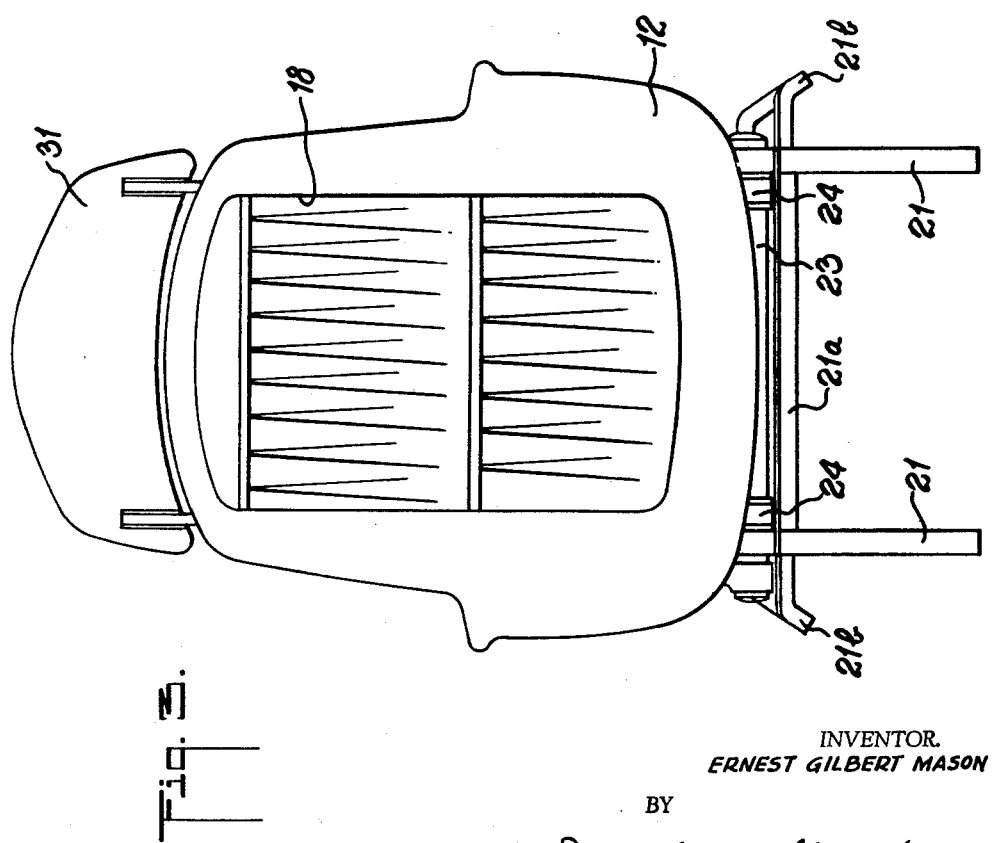

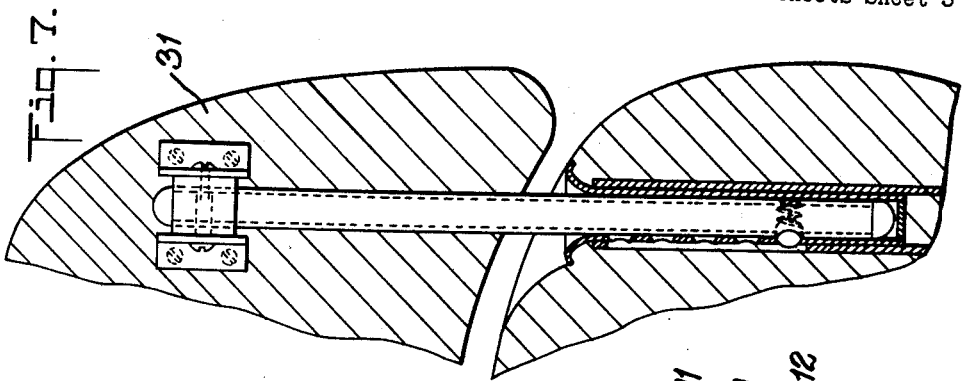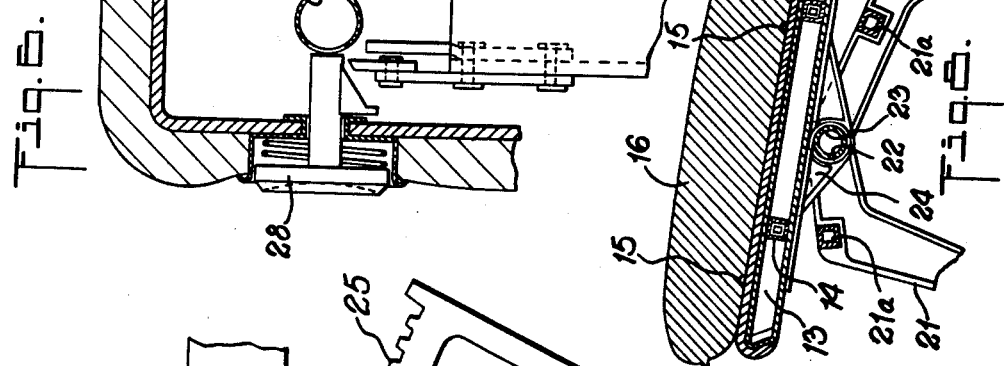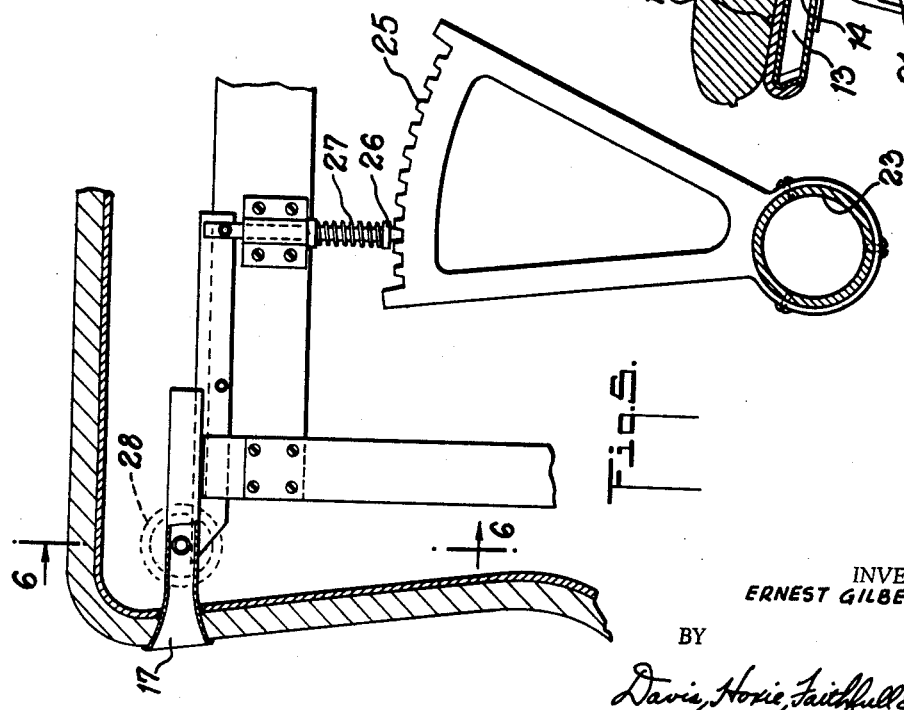

May 26, 1964  E. G. MASON  3,134,627
SEAT FOR PUBLIC USE
Filed March 19, 1962  6 Sheets-Sheet 4
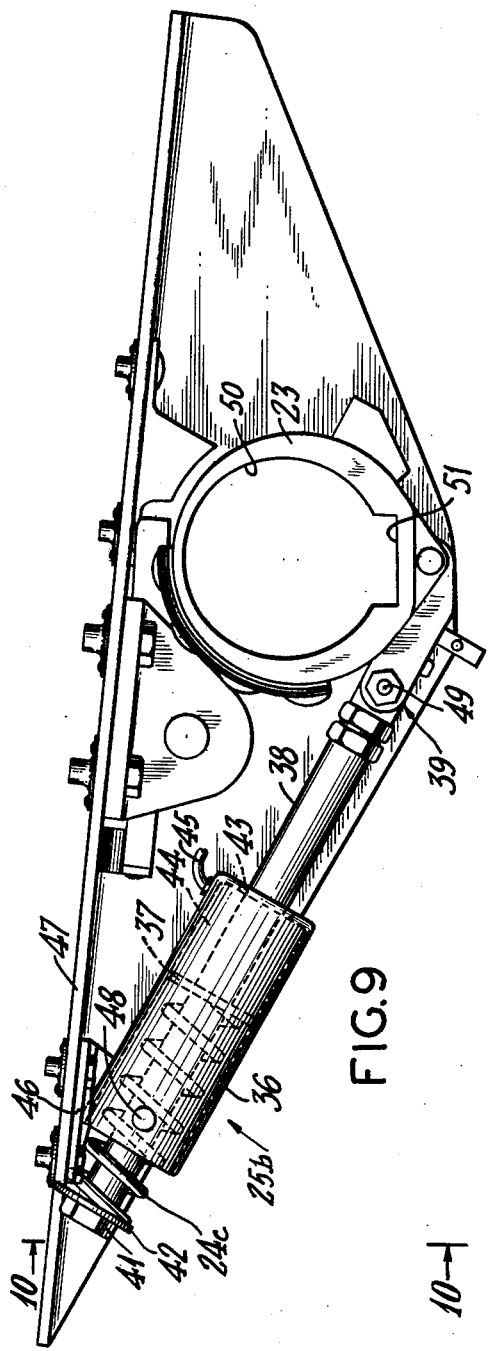
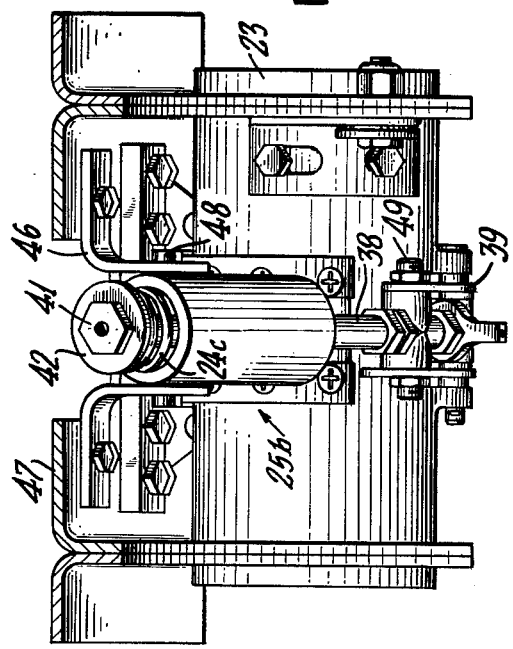
INVENTOR.
ERNEST GILBERT MASON
BY
Davis, Hoxie, Faithfull & Hapgood
ATTORNEYS.

May 26, 1964 E. G. MASON 3,134,627
SEAT FOR PUBLIC USE
Filed March 19, 1962 6 Sheets-Sheet 5

INVENTOR.
ERNEST GILBERT MASON
BY
Davis, Hoxie, Faithfull & Hapgood
ATTORNEYS.

May 26, 1964  E. G. MASON  3,134,627
SEAT FOR PUBLIC USE
Filed March 19, 1962  6 Sheets-Sheet 6
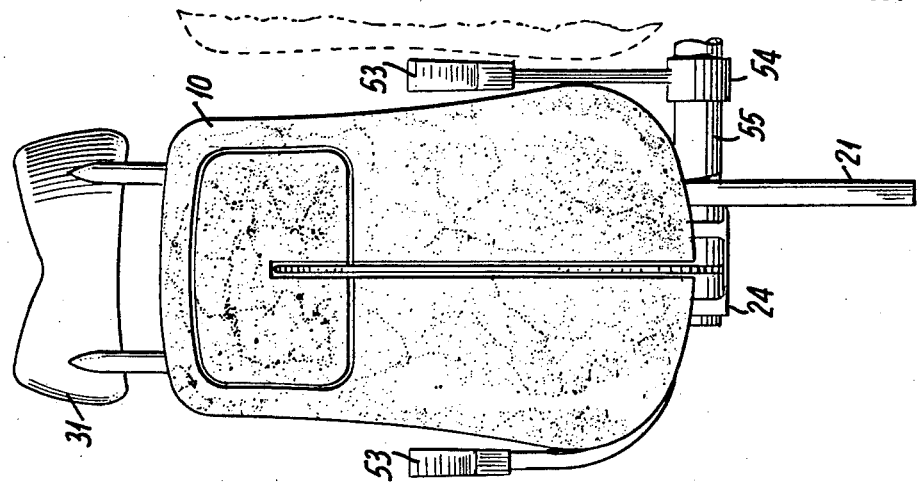
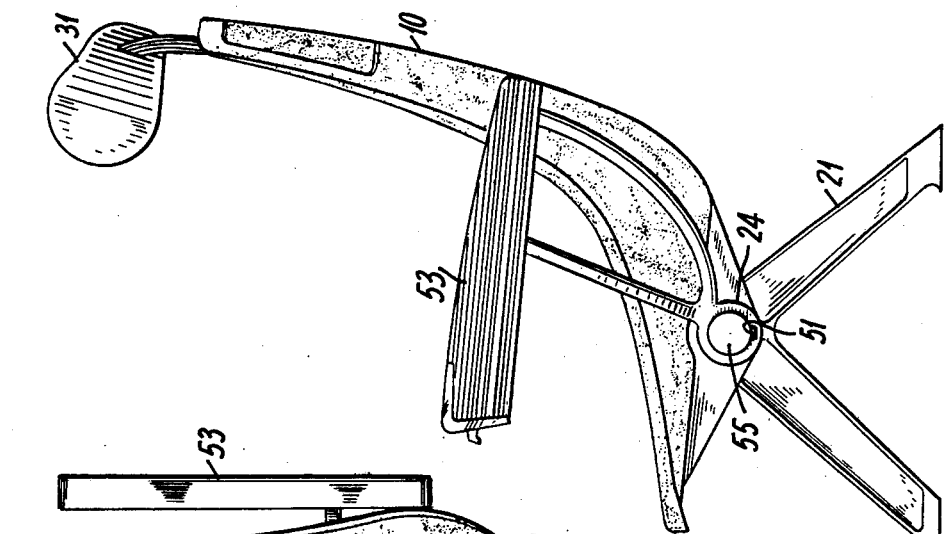
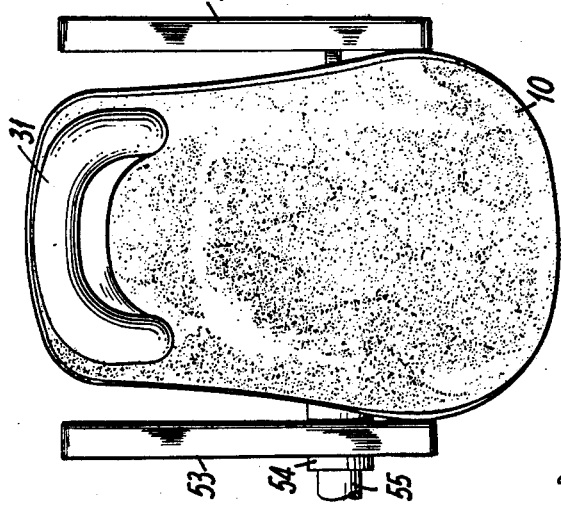
INVENTOR.
ERNEST GILBERT MASON
BY
Davis, Hoxie, Faithfull & Hapgood
ATTORNEYS.

United States Patent Office 3,134,627
Patented May 26, 1964

3,134,627
SEAT FOR PUBLIC USE
Ernest Gilbert Mason, 3210 Winona Ave., Burbank, Calif.
Filed Mar. 19, 1962, Ser. No. 180,429
4 Claims. (Cl. 297—416)

My invention relates to seats, more particularly to seats for public use.

This application is a continuation-in-part of applicant's U.S. patent application Serial No. 772,456, now U.S. Patent 3,043,624, issued July 10, 1962.

It has been assumed generally that a manufacturer of seats that are subject to the wear and tear of public use must sacrifice comfort and convenience of the user in order to ensure that the seat is able to withstand rough treatment. Public seats in current use are subject to complaints that they provide little or no variety of positions, no support for the parts of the body that are especially vulnerable to fatigue, and not enough room for the user's shoulders, arms, legs or packages. The manufacturer's problem is made especially difficult by requirements that the seat occupy little space and be simple to manufacture and install.

I solve the problem by providing separate seat shells for each individual user, each made of half-shells, preferably with bracing between them, each suspended above the floor so that it is separately rotatable about a trunnion immediately below it to rock back and forth, and each provided with cushion supports attached to it and an adjustable and removable headrest immediately above it.

One embodiment is shown in the drawings, of which FIG. 1 is a front elevation view of the seat; FIG. 2 is a vertical section view taken on line 2—2 of FIG. 1; FIG. 3 is a rear elevation view; FIG. 4 is a front elevation view of a portion of the seat partly in section; FIG. 5 is a detail section view of a mechanism for adjusting the tilt of the seat; FIG. 6 is a section view of the mechanism of FIG. 5 taken on line 6—6 of FIG. 5; FIG. 7 is a vertical section view of headrest adjusting mechanism; FIG. 8 is a vertical section view of a modified form of leveling spring support; FIG. 9 is a side internal view of an additional embodiment mechanism for adjusting the tilt of the seat; FIG. 10 is a section view taken on line 10—10 of FIG. 9; FIG. 11 is a front elevational view of a grouping of three seats of another embodiment of the invention; FIG. 12 is a side view of the chair of FIG. 11; FIG. 13 is a back view of the chair of FIG. 11; and FIG. 14 is a top view of the chair of FIG. 11.

The embodiment shown has a hollow seat shell 10 made of two half shells 11 and 12 that are fastened together and have between them longitudinal bracing 13 and transverse bracing 14. The bracing may be augmented or replaced by one or more other structural members as, for example, a rigid plastic foam member. The half shells 11 and 12 are covered on the outside with foam rubber that is in turn covered with vinyl upholstery. Attached to the half shell next to the user by snap fasteners 15 are cushions 16. The bottom of the back cushion is high enough to permit the part of the body immediately below the kidneys to fit partially into an area below that cushion and above the seat cushion in order to provide support for the kidneys. The front of the seat shell 10 is provided with table leg sockets 17. In the back of the shell 10 is a cavity 18 between the vertical bracing members 13 for holding a table and literature. The seat shell 10 is molded to fit the human body but it is not so confining that it is difficult to get into or out of. The layer of foam rubber under the upholstery provides a soft feeling all over the shell. The cavity 18 is designed so that its face is flush with the rest of the seat when it contains a table and the normal complement of literature.

Fixed to the floor are two leg brackets 21, each in the form of an inverted U made of forged aluminum. The brackets 21 are held rigid by leg braces 21a. Mounted in the braces 21a is a foot step 21b for use in connection with overhead luggage racks and the like. Each bracket 21 has a hole 22 at its apex. Extending through the holes 22 of both leg brackets is a tube 23 of circular cross-section. Rotatably mounted on the tube 23 are seat mounting brackets 24, and it is to these brackets that the seat shell 10 is fixed. Extending from the brackets 21 to the shell 10 are seat leveling springs 24a. These springs may be replaced by a single spring 24b as shown in FIG. 8. Fixedly mounted on the tube 23 is a toothed reclining adjustment member 25 cooperating with a member 26 mounted on the shell 10 and biased by a spring 27 to engage the member 25 and prevent rotation of the seat around the tube 23. The member 26 can be disengaged from the member 25 by pressing a spring loaded release button 28 which is so situated that it is operative normally but inoperative when a table leg is inserted in the leg socket 17.

The mechanism achieving this last-mentioned effect has a release button 28 attached to a shaft 28a mounted outside the hole 17 in such a way that it enters the hole when the button is moved inward unless there is a table leg in the hole; a cam 28b, mounted on the shaft, and a pivot bar 29, mounted at a pivot 29a. The bar 29 is attached to the member 26 at the opposite side of the pivot 29a. Normally when the button 28 is moved forward the shaft 28a moves inward, moving the cam 28b inward and causing the bar 29 to swing about the pivot 29a to raise the member 26 out of engagement with the member 25. However, when a table leg is in the hole, this action is prevented.

From the above description, it will be seen that the reclining adjustment mechanism is reduced to a minimum of parts for simplicity of manufacture and use; and for dependability and consequent minimizing of maintenance, the rotatable mounting on the tube provides the comfort of a rocking chair in a minimum of space. The brackets 21 provide chair legs which are simple to make and install and adjustable to fit any kind of tie-down fitting. The length of tube 23 can be varied to accommodate any number of seats, making it possible to use any available space with maximum efficiency. The provision that the seat reclining button is inoperative when table legs are inserted in the sockets 17 minimizes the danger of spilling from the table.

The headrest 31 is mounted on rods 32. The rods 32 are mounted telescopically in the vertical bracing 13 so that they can be raised and lowered to adjust the height of the headrest and can even be removed if desired. In the lower end portion of each rod 32 is a spring loaded ball bearing capable of coacting with any of a series of ball bearing seats 33 in the bracing 13 to hold the rod at a selected height. Mounted on the upper end of each rod 32 is a hard rubber sleeve 34 to which the headrest is rotatably attached by mounting brackets 35 to enable the headrest to be revolved about a horizontal axis. The sleeve 34 and the mounting brackets 35 are held together tightly enough to provide friction in order to hold the headrest in any selected position to which it is rotated. It has been found that a hard rubber sleeve provides greater friction with a metal bracket than a metal sleeve does.

The advantages to the user, in addition to those already mentioned, are that (1) the seat can be supported any distance from a neighboring seat to give each passenger room for his shoulders, and also to give him his own armrest for each arm; (2) the seat is suspended so that his legs can be extended in any direction or he can place under it his packages or luggage; and (3) the seat can be rocked as far as he desires without trespassing on the rights of his neighbors. The advantage to the manufacturer, installer and proprietor is that the seat requires a minimum of space and parts.

Another reclining adjustment mechanism for adjusting the tilt of the seat is shown in FIGS. 9 and 10 in which the sleeve 36 is pivotally mounted near one of its ends by a pivot 48 attached to a support 46. The support 46 is mounted on a bracket 47 which is rigidly connected to the underside of the seat shell 10. A shackle 39 is connected to the underside of the tube lock 23. The hole 50 of the tube lock 23 has a keyway portion 51 so that the hole and its keyway fits on tube 23. A rod 38 is attached to the free end of the shackle 39 by means of a nut and bolt assembly 49. The rod 38 passes through the free end of the sleeve 36 and out of the pivoted end. The gasket 43 seals the free end of sleeve 36 with a fluid tight connection. An annular ring 37, containing gaskets, is mounted on rod 38 so that it forms a chamber 44 for fluid at the free end of sleeve 36. The ring 37 is retained in a substantially uniform position relative to the rod 38 by means of a heavy duty spring 24c which is biased between the washer 42 held by the nut 41 and the end of rod 38 and the ring 37. Spring 24c allows the rod 38 to move, responsive to shock or other rocking motion, without manual control and without damage to the positioning assembly. A fluid reservoir, not shown, is connected to a pipe 45 leading into the chamber 44. A valve, not shown, is mounted convenient to the passenger and controls the flow of fluid from the reservoir to pipe 45. In order to cause the chair to move to a reclining position, the valve is opened and the occupant pushes the seat backwards, the fluid is expelled from chamber 44 and the chamber contracts in size. When the desired reclining position is reached, the valve is closed and the chair is held in position, since the chamber can no longer expel fluid. Similarly, to bring the chair up to a vertical position, the valve is opened and the chair is pushed vertically, forcing the fluid into chamber 44 from pipe 45.

In the embodiment of FIGS. 11–14, the shell 10 is constructed without integral arm rests. The arm rests 53 are each mounted on arm rest brackets 54, which brackets are separate from the seat shells 10 and seat mounting brackets 24. The seats recline but the arm rests are stationary.

The arm rest brackets 54 have a lock construction similar to the seat mounting bracket of FIGS. 9 and 10 for removably positioning them on the tube. This construction includes a hole, a locking means, and a keyway portion in the hole.

The tube 23 is modified for various uses with the brackets of FIGS. 9–14, by having a protruding key portion. For example, when the seat is used on airplanes with the chairs and arm rests of FIGS. 11–14, it is possible to seat six abreast in airplanes that now can seat only five abreast, permitting more economical use of airplane space. The seats may very rapidly be changed in their spacing so that in a few minutes an airplane may be changed from "tourist" to "first class." The spacing is changed by removing tube cap 55 from the end of tube 23, sliding the tube out of hole 22, unlocking and removing the required number of seats and arm rests, widening the space between the remaining seats, replacing the tube 23 in hole 22 and replacing cap 55 on the end of the tube. In a modification, the tube 23 is removed from legs 21 by unscrewing a separate disconnectable top cap portion of the legs. An airplane therefore need not be especially adapted for a particular class of service, but may be readily adapted when the need arises, providing economies in operation and scheduling.

I claim:

1. In combination, a plurality of leg brackets each having a hole at its apex, a tube extending through the holes, a plurality of seat brackets, means to removably and temporarily secure each seat bracket to the tube, a molded plastic seat shell mounted on each bracket, a plurality of armrest brackets, means to removably and temporarily secure each armrest bracket to the tube, and an armrest mounted on each armrest bracket.

2. The combination of claim 1 wherein a portion of each of the apex holes is in the form of a keyway and the tube has a protruding key portion.

3. The combination of claim 2 and having a plurality of arm rest brackets each having a hole with a keyway and an arm rest mounted on each bracket.

4. The combination of claim 2 wherein the seat brackets each have a hole for insertion of the tube and a portion of each of the holes forms a keyway.

References Cited in the file of this patent

UNITED STATES PATENTS

| | | |
|---|---|---|
| 1,378,704 | McPartland | May 17, 1921 |
| 2,269,918 | Sill | Jan. 13, 1942 |
| 2,563,347 | Long | Aug. 7, 1951 |
| 2,587,881 | Oakes | Mar. 4, 1952 |
| 2,605,813 | Seity | Aug. 5, 1952 |
| 3,043,624 | Mason | July 10, 1962 |